(No Model.)

I. E. STOREY.
ELECTRIC MOTOR AND GENERATOR.

No. 463,693. Patented Nov. 24, 1891.

WITNESSES:

INVENTOR
Imle E. Storey
BY
Johnston
ATTORNEY

UNITED STATES PATENT OFFICE.

IMLE E. STOREY, OF BOULDER, COLORADO.

ELECTRIC MOTOR AND GENERATOR.

SPECIFICATION forming part of Letters Patent No. 463,693, dated November 24, 1891.

Application filed April 16, 1889. Serial No. 307,419. (No model.)

*To all whom it may concern:*

Be it known that I, IMLE E. STOREY, a citizen of the United States, residing in Boulder, in the county of Boulder and State of Colorado, have invented certain new and useful Improvements in Electric Motors and Generators, of which the following is a specification.

My invention relates to electric motors and generators, the object being to provide a self-regulating machine in the true sense of the term—that is to say, a machine which depends upon its own construction and winding without the aid of external mechanical or electromechanical apparatus for its regulation. The chief novelty resides in the winding used, which, in connection with a constant-potential current and specific arrangement of the magnetic field-cores, accomplishes the desired result. The armature is of the Siemens type and has no special peculiarity. It revolves in a bipolar field consisting of an outer iron shell or ring, from which project radially inward two pairs of iron cores, each pair being connected to a common pole-piece. The winding is in reality a species of series winding. Its peculiarity is that each pole is acted upon by two magnetizing-coils having unequal magnetizing powers.

Figure 1:
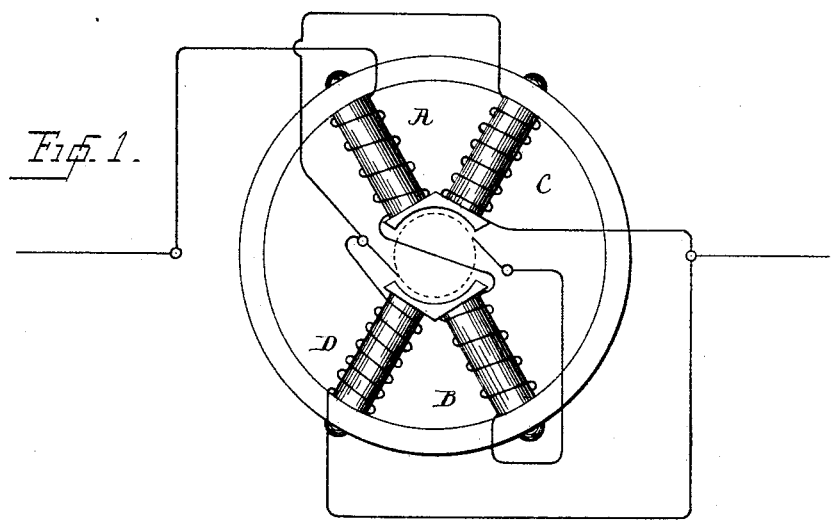
Figure 2:
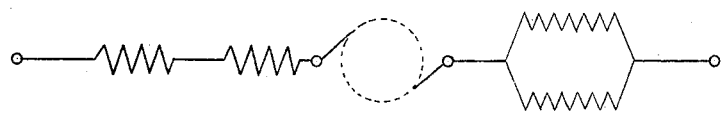
Figure 3:
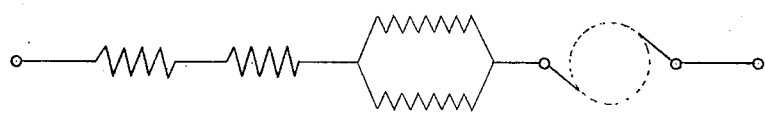
Figure 4:
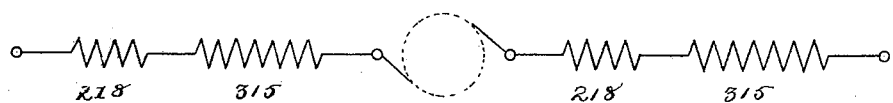
Figure 5:
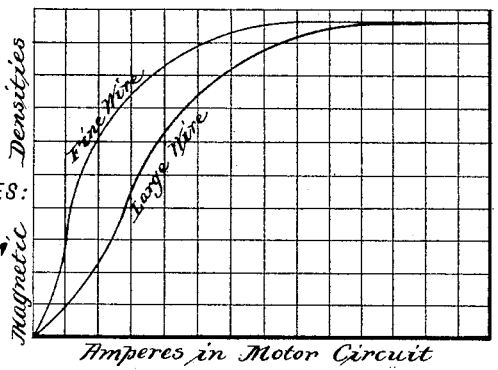

Referring to the accompanying drawings, Figure 1 represents the general shape of the field-magnets and a diagram of the circuits. Figs. 2, 3, and 4 represent, diagrammatically, different types of winding, but all embodying the principle herein described; and Fig. 5 is a diagram of curves representing the difference of magnetic potential between the magnets of each pair.

As before stated, the winding is in reality a kind of series winding. The two cores A and B, which are placed in line with each other and connect with corresponding portions of their respective pole-pieces, are wound with large wire, (No. 12,) the two coils being then joined in series, as shown in Figs. 1 and 2. The other two cores C D also occupy relatively symmetrical positions. They are wound with finer wire, (No. 18,) the two windings being joined in parallel connection, the pair being then connected in series with the other two coils and with the armature, as readily seen from Fig. 2, or Fig. 3, which is the same as Fig. 2, excepting that in Fig. 2 the armature is connected between the two kinds of coils. The winding is therefore virtually a series winding, in which the coils of one set of cores are first joined in parallel circuit instead of being put in simple series. The fine-wire coils consequently receive each only half of the current passing through the large-wire coils; but the current increases proportionately in all the coils, just as in an ordinary series winding. It is well to state that the large and small wire coils occupy the same positions at both pole-pieces relatively to the rotation of the armature.

With a series-wound motor run on a constant-potential circuit the fall of speed between running empty and with maximum load will represent a variation of at least fifty per cent. In a shunt-motor this variation would probably never exceed twenty-five or thirty per cent., and within the practical working limits the variation would not exceed five per cent., while it would be still less in a properly-proportioned motor.

It is well known that the magnetizing power of a coil, or the "magneto-motive force" which it exerts upon its iron core and the rest of the magnetic circuit, is proportional to the number of turns of wire and to the current (in ampères) passing through the coil, or, in other words, to the "ampère-turns." The fine-wire coils in the present case each have, say, six hundred and thirty turns, while the large-wire coils have two hundred and eighteen turns; but since, as seen from Figs. 2 and 3, the coils of fine wire only receive each half of the current passing through the motor the ampère-turns will always be the product of six hundred and eighteen by one-half the ampères in the motor-circuit. This is equivalent to making the number of turns three hundred and fifteen instead of six hundred and thirty, and then passing the whole circuit-current through the coil instead of half only. A somewhat larger size of wire could be selected, (say No. 13 or 14,) such as would give three hundred and fifteen turns instead of six hundred and thirty, and the coils could then be all connected in simple series, as in Fig. 4.

The working of the motor will be precisely the same with any of the windings shown in Figs. 2, 3, and 4. The peculiarity of the winding is that each pole is acted upon by two magnetizing-coils having unequal magnetizing powers, such that the fine-wire coil is always $\frac{3 \cdot 1 \cdot 5}{2 \cdot 1 \cdot 8} = 1.44\frac{1}{2}$ times stronger than the large-wire coil. As long as both cores A B are below the saturation-point the magnetic density through the cores C D of the fine-wire coils will always be forty-four and one-fourth per cent. greater than in the other two (large wire) cores. The consequences which follow from this are, first, that for all current values below the saturation-point the magnetic power of the fine-wire core will increase faster (by constant ratio) than that of the large-wire core; secondly, that the fine-wire core will become saturated at a much lower current value than would the other core. If we assume the ratio $\frac{218}{315}$ to be (roughly) $\frac{7}{10}$, and if we then plot out curves giving the corresponding magnetic densities for all the values of the circuit-current, the result is approximately as shown in Fig. 5 (which merely illustrates the idea relatively, not by absolute measure.) It is evident from these considerations for all values of current above the saturation of the weaker coil and core the two cores of each pair will be of approximately equal magnetic power, and they will both co-operate in their action upon the magnetic field in which the armature revolves, while for all values of current below the saturation of the weaker core the two cores of each pair will antagonize to a greater or less extent and act in a differential manner upon the magnetic field. The practical consequence of this relationship of the two cores of each pair is that below the saturation-point the weaker core (large wire) performs the function of a magnetic shunt or "keeper" for the magnetism produced by the stronger (fine wire) core. Not only the effect of the weaker core is not utilized in strengthening the magnetic field for the armature, but this effect is employed in diverting a portion of the magnetism actually produced by the fine-wire coil. In this case the difference of magnetic potential is always greater at the ends of the large-wire core up to the saturation limit. Hence the stronger potential overcomes the weaker, as is the case with all kinds of potential, (electrical, thermo-dynamic, &c.,) and the actual amount of magnetism in the weaker core will depend mainly upon the difference between the potentials; or, in other words, the amount of magnetism actually present in the weaker core is equal to what the excess of potential of the stronger core would normally produce if acting alone, this amount being of course of reversed polarity. These considerations make it at once evident that the magnetic field of the armature will not receive the total magnetism produced, and that even at low degrees of magnetic density in the magnet-cores the magnetism of the magnetic field will not increase in direct proportion with the current, as would be the case with an ordinary series-wound machine.

According to the above reasoning, therefore, it would seem possible to so proportion the winding of the two cores that the magnetic field may remain nearly constant, (the excess being neutralized,) or at least increased, but slowly, as the current in the main circuit is increased. It is well known that the magnetic field of constant-speed (shunt-wound) motors is nearly constant and that upon this depends the speed-regulating quality to a great extent. The relative constancy of the field magnetism in my motor thus accounts for the close speed regulation which I obtain. In shunt-machines the field-magnetism generally falls slightly as the current in the armature increases, and for this reason the compound winding is often used instead and supposed to give closer regulation, particularly where the armature-resistance is rather high. In my motor it is probable that the field-magnetism rises regularly, though slowly, from the beginning to the saturation-point, where it suddenly increases at a constantly-augmenting rate until it reaches its maximum. At the saturation-point the amount of leakage through the weaker core begins to diminish, and the next increase of current makes the leakage cease by making both cores of approximately equal magnetic potential, at which point they combine and co-operate in their action on the magnetic field of the armature. This peculiarity would account for the comparatively great starting-power which I claim for this motor. In fact, when the motor is started on a circuit of constant potential the first current-impulse will be very large and will probably saturate both cores. In this condition the motor will be, strictly speaking, in the same condition as an ordinary series-wound motor, and of course has the same starting-power. As the armature begins to turn and to generate counter-electro-motive force, the current will be gradually reduced until the magnetic density in the stronger core falls below saturation, whereupon the differential action will begin. It is only from this point that the motor is self-regulating.

In a shunt-motor the armature reaction upon the magnetic field increases with the current, because the magnetic field itself does not also increase, and the consequence is that the lead of the brushes requires to be changed a little. In my motor, owing to the relative position of the stronger core, the natural tension of the lines of force (which increases slightly with the increase of field magnetism as the current rises) would tend to counteract the distortion produced by armature reaction.

I am aware that the peculiar differential magnetic effects analyzed above are not necessarily confined to or inseparable from this particular form of field-magnet. The same results could be obtained with any form of machine having double or divided branching magnetic circuits for each pair of poles. Hence it will be seen that my winding gives nearly constant speed under wide variations of load when operated on a constant-potential circuit. In other words, my motor has all the "starting power" that characterizes the series motor and at the same time the speed-regulating qualities of a shunt-wound motor.

I am aware that a machine has been constructed on a similar principle of "magnetic shunting." This machine gives constant current; but, unlike the present machine, the "constancy" is not obtained solely and automatically by the winding, but involves the use of electrical and mechanical regulating devices.

I am not aware that previous to my invention the use of series-wound machines have ever been proposed or made for performing the functions of shunt or compound wound machines. Moreover, I am not aware that the series winding has ever before been used for the purpose of producing a constant or nearly constant magnetic field in a dynamo or motor.

It is obvious that the same winding is applicable to generators as well as to motors, in which case the winding would make the machine produce constant potential.

Having described my invention, I claim—

1. In an electric motor or dynamo, two pairs of field-magnets arranged on opposite sides of the armature and connected by a continuous ring of magnetic metal, each pair having a common pole-piece, the individuals of each pair being wound in series, but with a different number of turns, for the purpose described.

2. In an electric motor or dynamo, two pairs of field-magnets arranged on opposite sides of the armature and connected by a continuous ring of magnetic metal, each pair having a common pole-piece, the individuals of each pair being wound in series and in the same direction, but with a different number of turns, for the purpose described.

3. In an electric motor and in combination with the armature thereof, field-magnets consisting of a continuous outer iron ring or shell from which project inward radially two pairs of iron cores, each pair being connected to a common pole-piece and the magnets of each pair possessing unequal magnetizing powers.

4. In an electric motor and in combination with the armature thereof, field-magnets consisting of a continuous outer iron ring or shell from which project inward radially two pairs of iron cores, each pair being connected to a common pole-piece and each pair of cores being wound in series, but with unequal numbers of turns.

5. In an electric motor, two pairs of iron field-magnet cores, each pair connected to a common pole-piece and one of each pair of cores being wound and connected in series with each other, while the remaining ones of each pair are wound and connected in multiple with each other, but in series with the other two, substantially as described.

6. In a dynamo or motor, a field-magnet consisting of a continuous iron ring from which project inward radially two pairs of cores, said pairs of cores being connected, respectively, with the common pole-pieces, in combination with a series winding upon said cores, the magnetizing powers of the winding upon the members of each pair of cores being different, substantially as described.

In witness whereof I have hereunto signed my name in the presence of two subscribing witnesses.

IMLE E. STOREY.

Witnesses:
WM. W. ROSENBAUM,
F. C. GRUEY.